United States Patent [19]

Ben-Yehuda

[11] Patent Number: 4,477,051
[45] Date of Patent: Oct. 16, 1984

[54] FLOW CONTROL VALVE

[76] Inventor: Avram Ben-Yehuda, 14924 Greenleaf St., Sherman Oaks, Calif. 91403

[21] Appl. No.: 379,502

[22] Filed: May 18, 1982

[51] Int. Cl.³ .................... F16K 31/05; F16K 31/145
[52] U.S. Cl. ........................................ 251/30; 251/45; 251/82; 251/298
[58] Field of Search ...................... 251/30, 45, 46, 82, 251/298

[56] References Cited

U.S. PATENT DOCUMENTS

| | | | |
|---|---|---|---|
| 1,369,444 | 2/1921 | Koplin | 251/82 |
| 1,756,824 | 4/1930 | Hasemann . | |
| 2,051,294 | 8/1936 | Gauger . | |
| 2,504,006 | 4/1950 | Davis | 251/82 |
| 2,884,003 | 4/1959 | Jensen . | |
| 2,900,163 | 8/1959 | Nickells . | |
| 2,973,935 | 3/1961 | Sullivan | 251/30 |
| 3,112,094 | 11/1963 | Nees et al. | 251/46 |
| 3,476,353 | 11/1969 | Stampfli | 251/45 |
| 3,556,464 | 1/1971 | Griswold | 251/46 |
| 3,943,975 | 3/1976 | Schnittker . | |
| 3,967,808 | 7/1976 | Lieding | 251/46 |
| 4,301,992 | 11/1981 | Karbo | 251/30 |
| 4,336,918 | 6/1982 | Karbo | 251/30 |

FOREIGN PATENT DOCUMENTS 1108509 6/1961 Fed. Rep. of Germany .

Primary Examiner—George L. Walton

[57] ABSTRACT

A straight-through electrical activated valve is disclosed having a flapper closure element responsive to differential pressures of a valve cavity and fluid pressure upon the opposing sides of the diaphragm. A pilot valve (or electric solenoid) is provided to drain the valve cavity. The flapper closure element seats against the body of the valve in such a manner that the valve operates as a reverse check valve. If a straight line is extended from the valve seat plane of the valve body the resulting angle with the perpendicular axes would be obtuse.

12 Claims, 4 Drawing Figures

FLOW CONTROL VALVE

BACKGROUND OF THE INVENTION

Each year the quantity of land in America that can be used to produce food is diminished by urban spread and changing weather patterns. This problem is compounded by the fact that the number of people in the world who need farm-grown food increases. It is therefore absolutely imperative that maximum and efficient use be made of all our remaining farming land. One method of establishing such efficient use is the age-old water irrigation of arid land to render the same crop producing land; however, some systems of irrigation require large capital expenditures and are dependent upon the flow of water from a natural source. This problem can be eliminated by artifically constructing irrigation systems via man-made wells, pipes, valves, etc. In order to maximize the efficiency of artifical irrigation systems, it is sometimes necessary that the flow of water through the respective conduits be started and stopped at different predetermined intervals. One relatively sophisticated method to perform this function is to preprogram the opening and closing of watervalves in the irrigation system. In this manner, crops may be watered on a regular, yet perhaps intermittent basis as is their need. This invention presents a new type of fluid flow control valve to accomplish this function.

This fluid flow activated valve can also be useful in other areas extrinsic from irrigation farming, although the latter is the preferred use of this apparatus. For instance, this valve may be utilized in agriculture, turf treatment (commercial and residential), landscaping, lawn and gardening applications or in a gas pipeline where it is necessary that the gas activate the opening and/or closing of a valve with the aid of a solenoid. In other contemplated environments this valve may be utilized in such small conduits as individual capillaries of a reverse osmosis system or in such large systems as sewage pipes or petroleum pipelines.

1. Field of the Invention

The field of this invention relates generally to means for resuming a fluid flow or alternatively a means for fluid flow stoppage. More specifically, the field of this invention relates to an apparatus to be situated in a conduit for the prohibiting or permitting of the flow of a fluid therethrough. The flow blockage is accomplished by a fluid flow-activated control valve which possesses unique straight flow-through characteristics as result of the unique arrangement of its parts.

2. Prior Art

Candor compels a recognition of all known prior art. Apparatus for the stoppage of fluid flow in a conduit are generally considered valves, which are generally classified in the Patent Office *Manual of Classification* in Class 251. Some of the applicable areas of Class 251 relating to this application are Subclasses 44, 45, 46, 58, 30 and 298 other areas of Class 251 and other areas of other classes may also be pertinent to this invention.

One early use of a flow stoppage means in a conduit is exemplified by Hasemann, U.S. Pat. No. 1,756,824 which discloses the use of a throttle in a conduit, the position of which is controlled by a hydraulic piston to correct small variations in pressure without creating disrupting fluctuations in pressure. The throttle is ultimately responsive to a diaphragm sensitive to a pressure in the flow conduit at a point downstream of the throttle valve. A patent issued to Gauger in 1936, U.S. Pat. No. 2,051,294, shows a spring biased fluid valve, which is closed in the at-rest position. An upper pressure chamber is provided whereby when the same is evacuated a diaphragm rises and thereby raises a valve seat opening a channel for fluid flow. However, it is noted that in this disclosure, a straight through flow pattern is not feasible nor provided; that is, the fluid must flow over and around at least two static walls before continuing traversal through the conduit. German patent No. 1,108,509 issued June 8, 1961 shows a pivoted butterfly stoppage means in communication with a pressure sensitive hydraulic cylinder responsive to the differential of an external pressure and the pressure in the fluid conduit. Another flow-activated valve, which is spring biased in the closed position is disclosed in Jensen U.S. Pat. No. 2,884,003, having a pivotally mounted butterfly valve in the passage conduit. A piston and a solenoid operate conjunctly to open and close the butterfly valve. Another flow activated diaphragm valve is disclosed in Nickells, U.S. Pat. No. 2,900,163, which also lacks a disclosure of a straight flow through of the fluid even when the solenoid acts to overcome the spring tension and thereby raises a plunger opening the valve seat for flow of fluid.

A solenoid operated pilot control valve (having a similar configuration in the flow through conduit of that of FIG. 1 of the instant drawings) is exemplified in Schnittker, U.S. Pat. No. 3,943,975. The springs of this valve are aligned so as to provide a means for fully opening the diaphragm even in periods of low differential pressure. Heretofore, the uncovered prior art has not provided a relatively low cost diaphragm responsive valve wherein the valve seat is inclined at an obtuse angle to the axis of the passage of the flow fluid in the conduit. And by inclining the valve seat relative to the axes of fluid passage, the pressure drop through the valve is minimized.

Antithetical to this position, a recent patent issued to Karbo U.S. Pat. No. 4,301,992, discloses an inclined plane valve seat that is diaphragm responsive. The valve seats to a portion of the valve body which forms an acute angle with the axial passage of fluid flow. The fluid must therefore flow over an inclined static wall in the open position as shown in FIG. 3 of Karbo. A cavity of varying pressure is provided surmounted to the valve element wherein the change in diaphragm location is sufficient to seat or unseat the valve element. It is also disclosed in Karbo that the seat element is biased in the closed position via a spring. The diaphragm of this valve is continuously under pressure during flow stoppage periods (generally between 75–95% of the time for most irrigation systems). This constant force of fluid can diminish the life expectancy of the diaphragm. And a rupture of the same could cause severe flooding and crop damage.

The above discussion of prior art is not a total compendium of knowledge relating to flow restriction devices by any means, but it is believed representative of various aspects previously disclosed in the prior art and which are exemplified generally by FIG. 1 of the instant drawings.

SUMMARY OF THE INVENTION

Unlike the uncovered prior art, this fluid flow activated diaphragm valve operates in a straight through flow pattern and actually functions as a reverse check valve. One of the problems addressed by this invention is removal of the pressure force on the diaphragm in the closed position. In existing valves uncovered, the diaphragm is under pressure during or at the closed position. Antithetically, the instant straight-through flow valve has a diaphragm which is under no stress whatsoever during or at the closed position. And this greatly increases the life expectancy of the diaphragm. The problem of diaphragm rupture is greatly mitigated by this elimination of pressure on the flexible but rupturable diaphragm.

In the event of a ruptured diaphragm the instant valve can be opened manually via a mechanical override. The latter also provides a system where no water need be bleed to the atmosphere while the valve is being operated via the manual override. A bias spring can but need not be incorporated into the design of the valve. It is not mandatory because the diaphragm return to its normal position will be slow and even, thereby eliminating greatly the effects of "water-hammer". It is most advantageous to have a straight-through fluid flow pattern in order to provide a minimum pressure loss and flow over the cross-sectional area of the conduit. This straight-through fluid flow pattern also reduces turbulence in the conduit as the fluid of the uncovered prior art valves (such as FIG. 1 of the instant drawings) must surmount a static wall and cascade drastically into the open conduit for its continuing journey through the conduit. In certain prior art valves, any indigenous impurities in the fluid such as rocks, gravel, sand, etc. accumulate at the base of the static wall and at the opening of the valve seat to hinder flow and create maintenance problems. In the use of the instant valve, rocks, gravel, sand, etc. are washed straight through the conduit with the fluid and not undesirably deposited in the valve. If for any reason the diaphragm of this valve is ruptured, the valve will stay (default) in the closed position. This is the direct result of the equal amount of pressure being situated on both sides of the diaphragm member because there is an equal pressure in the upper and lower chambers of the valve. Also, there is no stress on the diaphragm of the instant valve in the closed position. The stress on the bottom side of the diaphragm occurs only during the opening of the valve, which is deminimus stress as compared to a valve having constant fluid pressure on the diaphragm in the closed position.

The use of the instant flow control valve will generally be in irrigation systems that comprise valves that open and close at intermittent intervals. For instance, in some months the valves will remain closed permanently, in other months they will be required to open and close daily or even hourly. It is therefore an object of this invention to provide a relatively inexpensive, viable and workable flow control valve to suit different irrigation systems. This valve will restrict or prohibit the flow of fluid through conduits in a relatively more expiditous and maintenance free manner vis-a-vis those valves discussed previously.

The instant valve is also equipped with a manual override so that it may be opened by turning the "flow adjust" handle counter-clock-wise, which mechanically lifts the flapper element and thereby opens the valve for fluid flow. Or the valve may be manually closed by use of the same flow adjust handle, which mechanically lowers the flapper element down to the valve seat. The instant valve will be further described in conjunction with the description of FIGS. 2-4 in contradistinction to the prior art figure of FIG. 1.

DETAILED DESCRIPTION OF THE DRAWINGS

In order to highlight the features of this invention a conventional flow activated diaphragm flow valve is discussed concomitantly with the now-claimed flow valve. For this reason, FIG. 1 is labeled "Prior Art" a composite drawing.

All unnecessary accouterments of the valves and any extrinsic hardware have been eliminated in order to highlight the features of this invention. The specific placement of parts on the valve should not be viewed as a limitation upon this invention but may be modified to the extent of knowledge of those reasonably skilled in the art.

Figure 1:
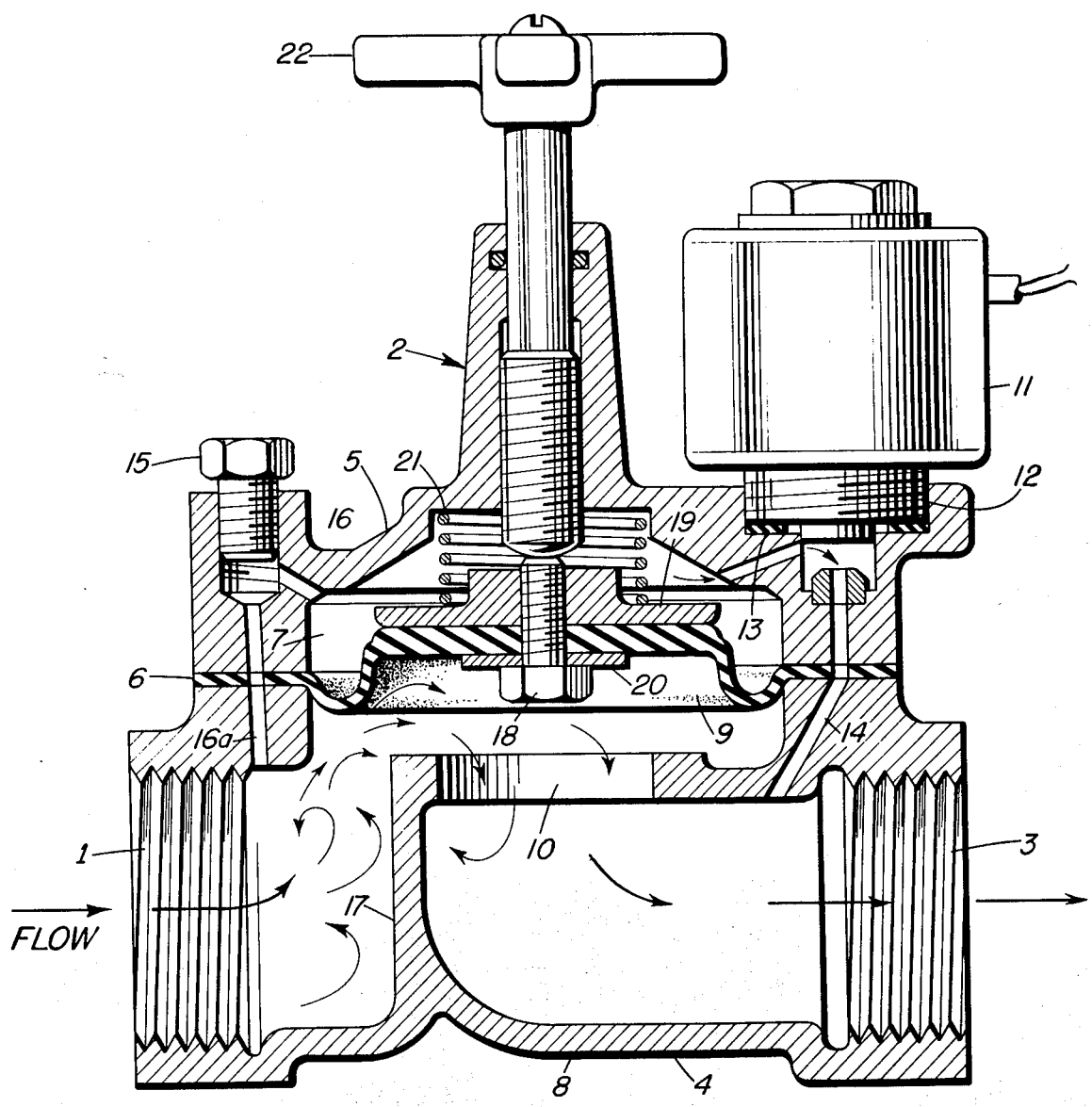
FIG. 1 is a vertical, axial, sectional view of a conventional diaphragm valve shown in the open position.

The prior art valve of FIG. 1 is shown in the open position. The valve 2 connects two openings, inlet 1 and outlet 3. Fluid flow is provided through valve 2 from inlet 1 to outlet 3. The valve 2 is comprised of a valve body 4 and a valve cover 5. And these latter entities are provided with an intermediate gasket 6 to prevent leakage. The gasket may be part of the moveable and flexible diaphragm 9 or it may be a separate entity. Two discrete chambers are provided by the elements of the valve, an upper chamber 7 and a lower chamber 8, the latter being defined in the closed valve position by diaphragm 9 seating into opening 10.

In order to open this valve the pressure in the upper chamber 7 must be less than the pressure in the lower chamber 8. In order to accomplish this a solenoid valve arrangement is provided. A solenoid 11 is surmounted to the valve cover 5 and held in place by screw 12. In operation the solenoid causes egression of fluid from upper chamber 7 through first upper chamber passageway 13. This fluid may be allowed to egress from the valve cover, or in the alternative it is preferred that it be channeled to the outlet side of the valve cavity 8 via conduit 14.

The valve can be closed in the reverse manner using conduits 16 and 16a with an intermediate plug 15 (manual operation) or even an automatic opening-closing device not depicted in the instant drawing. If permitted fluid will flow from inlet 1 through conduit 16a and 16 to upper cavity 7 thereby eventually equalizing the pressure of the lower and upper valve cavities. It can clearly be seen that fluid must surmount static wall 17 before descending into the downstream side of the valve. This barrier to fluid flow is a necessary element of the conventional flow control valve (including somewhat even the Karbo disclosure) and causes hammering, noise and vibration of the pipes and valve, all of which result in increased maintenance and diminshed life expectancy of the flow control valve.

In the closed position the diaphgram 9, flexible and resilient in nature, seats against opening 10. The diaphragm 9 is secured by a screw 18 washers 19 and 20. A spring 21 may be used to bias the diaphragm to the closed position. For manual control 22 is provided which bears against the screw 18. In the closed position constant fluid pressure is exerted upon the diaphragm.

In case of rupture the valve would allow free passage of fluids as if in the open position (diaphragm raised), which can cause damage to crops, gardens or homes.

Figure 2:
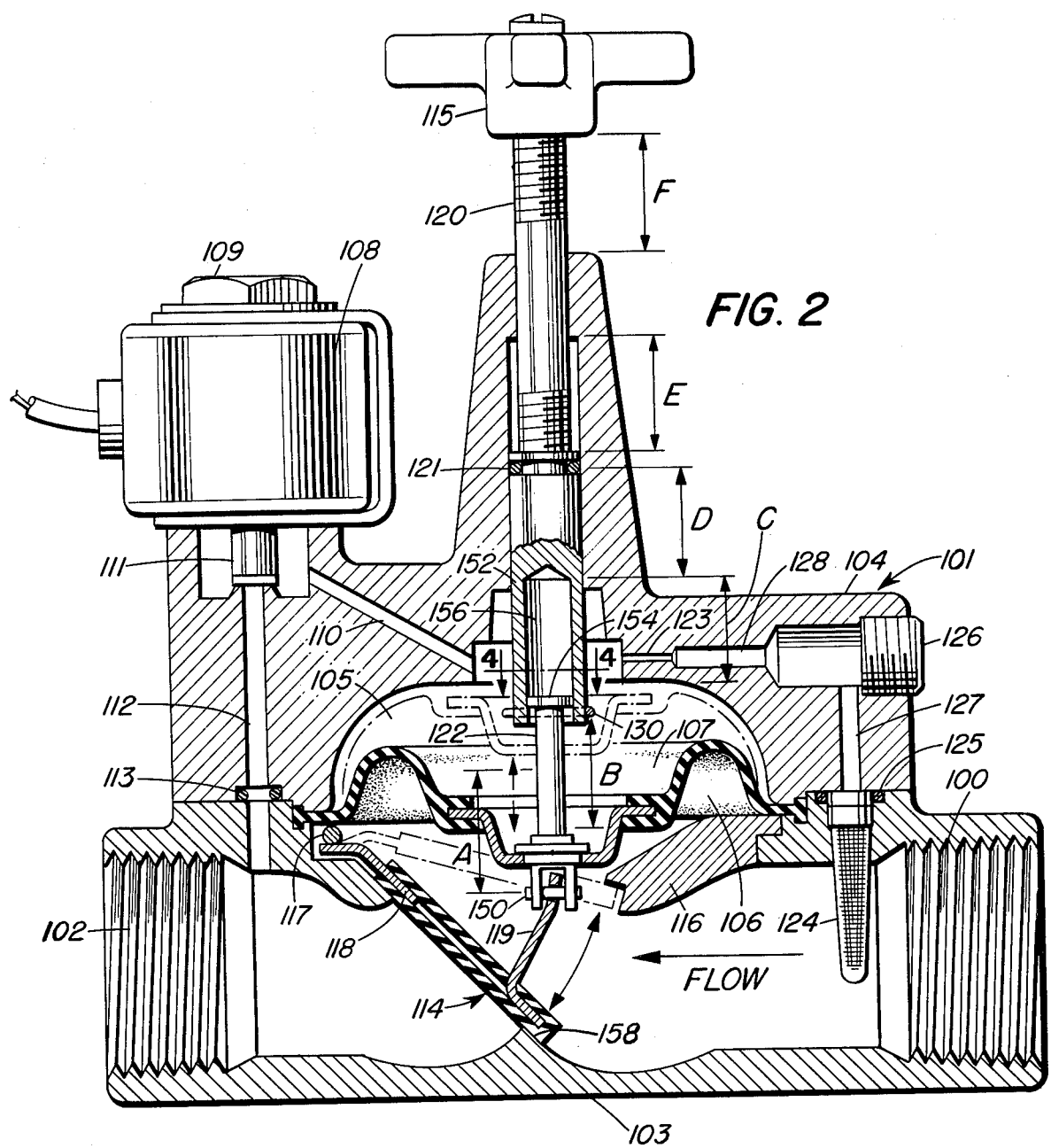
FIG. 2 is a vertical, axial, sectional view of a preferred embodiment of my invention.

FIG. 2 is a drawing of the valve of this invention made to highlight the important aspects thereof. The solid lines depict the valve in the closed position and the phantom lines indicate the elements of the valve in the open position.

Two conduits are connected by the valve 101 of this invention. The inlet conduit is 100 and the outlet 102, the fluid thus flowing from conduit 100 to 102. The valve 101 comprises a valve body 103 and a valve cover 104. Two chambers, an upper 105 and a lower 106 are established by the resilient and flexible diaphragm 107 transversing said chambers. The pressure differential in these two chambers is the active force in opening and closing the fluid flow valve. The pressure differential in the chambers is provided via the solenoid unit 108 being secured to the valve via solenoid nut or screw 109. When activated fluid from upper chamber 105 egresses from the same through solenoid-upper cavity passageway 110, through solenoid plunger 111 (when open) and to the outlet side of the valve through conduit 112 the pressure differential is obtained and the diaphragm is caused to rise. Conduit 112 is sealed by "O" ring 113 at its conjunction with valve body 103.

The loss of fluid creates a pressure differential between the respective upper and lower chambers, which ipso facto causes the flexible diaphragm to rise thereby lifting flapper closure element 114. This element is made of a non-porous material and is generally of circular configuration to block the fluid flow through the valve. In the closed position the pressure is forced against this rigid non-porous element and not against the flexible diaphragm which is under pressure equilibrium. Of course the flapper element is responsive totally to the diaphragm or to the manual control handle 115. The flapper element is made of any or a combination of any of the following materials: steel, stainless steel, brass, plastic, ABS plastic, urethane, hardwood, iron, copper, nickel, cobalt, chromium, tungsten, silver, gold, cadmium or beryllium. When the flapper element is raised by the aforesaid pressure differential it seats against anti-turbulence barrier 116. At this time the straight-through flow of fluid is achieved without the necessity for a static wall. See FIG. 1. #17. The flapper closure element is raised by movement around flapper element pivot pin 117 and flapper element stiffener 118. The communication between the flapper element 114 and the diaphragm 107 is achieved by flapper control post 119. The latter may be connected to either of the former by conventional means, i.e., bolts, pin-and-groove, etc. The valve may be closed by turning the manual control handle 115 clock-wise changing the length of threaded stem 120 and "O" ring 121. The relative positions of the elements are depicted by distances A,B,C,D,E and F which are defined as:

A — movement of flapper control pin
B — free movement for diaphragm stiffener neck
C — internal clearance in stem for diaphragm stiffener head
D — manual closing movement of stem "O" rings seal area
E — manual opening of stem
F — manual closing of stem threads C, must equal D or less
D ≧ C (F must be greater than C & D)

The resilient diaphragm is connected to shaft 122 by any conventional rubber to steel or the like connection and to threaded stem 120 (the lower portion as 152) via a clip 130.

In this connection flapper control post 119 is secured to bottom portion of shaft 122 by conventional means, i.e. rivet, bolt and nut, cotter-pin, etc. at 150. Shaft 122 is attached to the cylindrical part of internal bore 152 by clip 130 forming the head of the shaft 154 which will traverse the cylindrical bore 156 during opening and closing. That is in the open position the head of the shaft seats in the top of the bore shaft.

Figure 3:
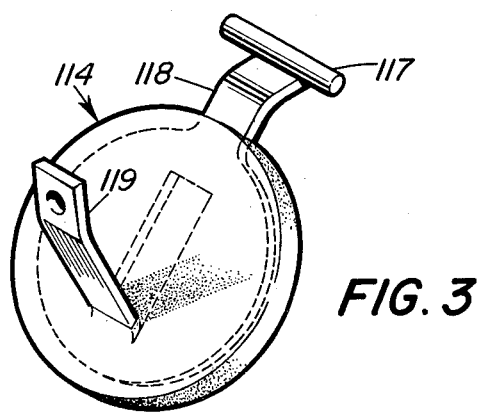
FIG. 3 is a perspective view of the valve flapper element.
Figure 4:
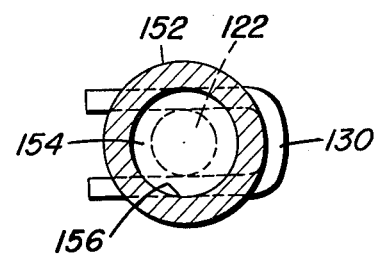
FIG. 4 is a sectional view taken along line 4—4 of FIG. 2.

The angle that the flapper element 114 creates with the bottom interior wall of valve body is obtuse, preferably 95° to 170° and most preferably 120° to 150°. The seat of the flapper element with the bottom of the valve body at 158 is made by conjunction of the parts, or if preferred, a separate circular gasket can be used. The flapper element may also seat in a recession within the walls of the valve body. When the flapper element is open, i.e., seated to the anti-turbulence barrier 116 it may be lowered and the valve closed by the following: control orifice 123 permits flow of fluid from inlet conduit 100 to upper cavity 105 via inlet filter 124, "O" ring 125, plug 126 and conduits 127 and 128. The inlet filter may be of the horizontal variety, the same being placed in either conduits 127 or 128. The purpose of the filter is to remove foreign material from the fluid so as not to clog the control orifice 123. In FIG. 3 a plan view of the flapper closure element is shown with flapper pivot pin 117 and flapper stiffener 118. The flapper closure element is circular 114 which seats at interconnecting points 158. Flapper control post 119 is shown disconnected from shaft 122 at connection point 150. FIG. 4 is exemplary of shaft connection clip 130 of cylindrical unit 152 and shaft 122 as viewed along lines 4—4.

It may appear at first that the pressure differential between the upper and lower sides of the diaphragm would not be sufficient to raise the flapper closure element. Surprisingly, this has been found to be an erroneous first impression. Evidently, the fluid force vector against the flapper closure element is less than the fluid upper force vector against the bottom side of the diaphragm. Theoritically, the force is equal to the area times the pressure, i.e., $F=(P) \times (A)$. Accordingly, where the area of diaphragm ($A_D$) is much greater than the area of the flapper ($A_F$) the resultant force is sufficient to raise the flapper. In this manner the valve operates as a reverse check valve whereby the flapper is being raised by the diaphragm in a counter-clock-wise direction, which is opposite to the water flow direction.

OBJECTS AND EMBODIMENTS

An object of this invention is to provide a straight through flow valve with smaller maintenance problems and longer average usable life.

Another object is to provide a valve with reduced diaphragm rupture problems as a consequence of the constant pressure of the fluid not totally pressing against the diaphragm in the closed position.

One embodiment of this invention comprises a valve housing having a passage extending therethrough for passage of a fluid, said passage having an inlet, and outlet and a longitudinal axis, wherein said passage possesses a valve seat means forming a plane obtuse to said longitudinal axes; a valve cavity having a fluid pressure communicating with said fluid passage, wherein said fluid pressure in said valve cavity is determinitive of whether passage of fluid through said fluid passage is prohibited or permitted; a resilient moveable diaphragm means having an upper and lower side extending across said cavity to define said valve cavity on the upper side of said diaphragm and said passageway on the lower side of said diaphragm; a cavity fluid control means in communication with said valve cavity by means of a cavity fluid passageway to permit controlled egress of fluid from said cavity and thereby reduce said fluid pressure in said cavity; and a flapper closure element comprising means for pivotally mounting said flapper closure element to said valve housing at a point in the outlet side of said valve housing; means for seating said flapper closure element to said valve seat means to provide that said flapper closure element is situated at an obtuse angle to said longitudinal axes when said valve is in the fluid prohibiting mode; an elongated connection means communicating said moveable diaphragm means with said flapper closure means wherein said diaphragm raises as a result of loss of fluid pressure via said fluid control means therein raising said elongated connection means and said flapper closure element to permit passage of fluid through said passageway; and when said diaphragm lowers, as a result of an increase in fluid pressure in said upper valve cavity to thereby lower said elongated connection means and said flapper closure element to situate said flapper closure element against said valve seat means and thereby prohibit flow of fluid through said fluid passage.

Another aspect of this invention comprises a valve housing having a fluid passage extending therethrough for the passage of fluid from a fluid passage inlet to a fluid passage outlet and a longitudinal axis parallel to said passage; a valve seat means in said housing wherein the plane of said valve seat means is at an obtuse angle with said longitudinal axis, a valve cavity within said housing possessing fluid pressure, the quantity of which is response to a cavity fluid egression means; a resilient moveable diaphragm bifurcating said cavity and said fluid in said passage wherein said cavity is situated above said diaphragm; a flapper closure element mounted pivotally to said valve housing and in interconnection with said resilient moveable diaphragm means for seating against said valve seat means.

Yet another aspect of this invention comprises the above valve wherein said cavity fluid removal means comprises a solenoid valve in communication with said valve cavity.

I claim as my invention:

1. A valve comprising:
   (a) a housing having an inlet and an outlet, a flow passage interconnecting said inlet and said outlet and defining a longitudinal axis therein:
   (b) a valve seat in said passage, said valve seat defining a plane which forms an obtuse angle with said longitudinal axis relative to the flow direction from said inlet;
   (c) a cavity in said housing in communication with said passage;
   (d) a moveable diaphragm disposed across said cavity to define a diaphragm control cavity on one side of said diaphragm, with the other side of said diaphragm in fluid communication with said passage;
   (e) control means for varying the fluid pressure in said diaphragm control cavity to control the position of said diaphragm, said control means including fluid passages in said valve housing communicating said control cavity with said flow passage and means for controlling the flow of fluid from said control cavity, said diaphragm being moved outwardly of said control cavity as fluid is introduced into said control cavity, and said diaphragm being moved inwardly into said control cavity as fluid is passed from said control cavity;
   (f) a flapper closure element pivotally disposed in said housing and adapted to cooperate with said valve seat to stop flow through said flow passage when said closure element abuts said valve seat, and to permit flow through said flow passage when said closure element is spaced from said valve seat;
   (g) means connecting said closure element with said diaphragm such that as said diaphragm is displaced inwardly into said control cavity, said closure element is moved away from said valve seat by said connecting means and said diaphragm to permit fluid flow through said flow passage, and said closure element is moved toward said valve seat by fluid flowing into said passage from said inlet as the diaphragm is displaced outwardly from said control cavity to restrict fluid flow through said fluid passage; and,
   (h) means operatively coupled to said diaphragm and said connecting means to permit movement of said closure element away from and towards said valve seat, independently of movement of said closure element by said diaphragm in response to fluid pressure within said control cavity, to provide adjustment of the position of said closure element in the open mode of the valve and to permit opening and closing of the valve independently of the operation of said diaphragm.

2. A valve as set forth in claim 1, wherein said operative means comprises:
   (a) displacement control means adjustably moveable towards and away from said control cavity; and
   (b) a coupling interconnecting said displacement control means and said diaphragm and permitting a predefined range of movement of said diaphragm relative to said displacement control means, said coupling having means to mechanically couple said displacement control means and said diaphragm at the limits of said predefined range.

3. A valve as set forth in claim 2, wherein said coupling comprises:
   (a) a recess of predetermined depth provided adjacent an end portion of said displacement control means;
   (b) an elongated connector moveably received within said recess, said connector having means at one end to prevent complete withdrawal from said recess and being attached at the other end to said diaphragm, said connector freely moveable within said recess in response to the displacement of said diaphragm, said displacement control means being selectively positionable relative to said control cavity such that the movement of said connector between the extremities of said recess controls the position of said diaphragm; and,
   (c) said means to mechanically couple being defined by the closed end of said recess and by said withdrawal-preventing means on said connector.

4. A valve as set forth in claim 3, wherein movement of said displacement control means away from said control cavity is transmitted to said closure element via said connector and said connecting means, to move said closure element away from said valve seat independently of the position of said diaphragm in response to fluid pressure within said control cavity.

5. A valve as set forth in claim 1, wherein the means for controlling the flow of fluid from said control cavity includes a solenoid-activated valve disposed in one of said fluid passages.

6. A valve as set forth in claim 5, wherein said solenoid-activated valve is disposed in a fluid passage communicating said control cavity with said flow passage downstream of said valve seat.

7. A valve as set forth in claim 1, wherein said valve seat comprises a recess in said valve housing.

8. A valve as set forth in claim 1, wherein said valve seat comprises a raised portion in said valve housing.

9. The valve as set forth in claim 8, wherein said angle is 120° to 150°.

10. The valve as set forth in claim 9, wherein said flow-directing member is so disposed relative to said valve seat that a portion of said flapper closure element abuts said member when the valve is in the full-open mode.

11. A valve as set forth in claim 1, wherein said obtuse angle is of approximately 95° to approximately 170°.

12. The valve as set forth in claim 1, further comprising a flow-directing member disposed within said flow passage to guide flow through said passage and to reduce turbulence of the flow.

* * * * *